H. G. MARDEN.
CLUTCH.
APPLICATION FILED JUNE 29, 1909.
964,874.
Patented July 19, 1910.
2 SHEETS—SHEET 1.
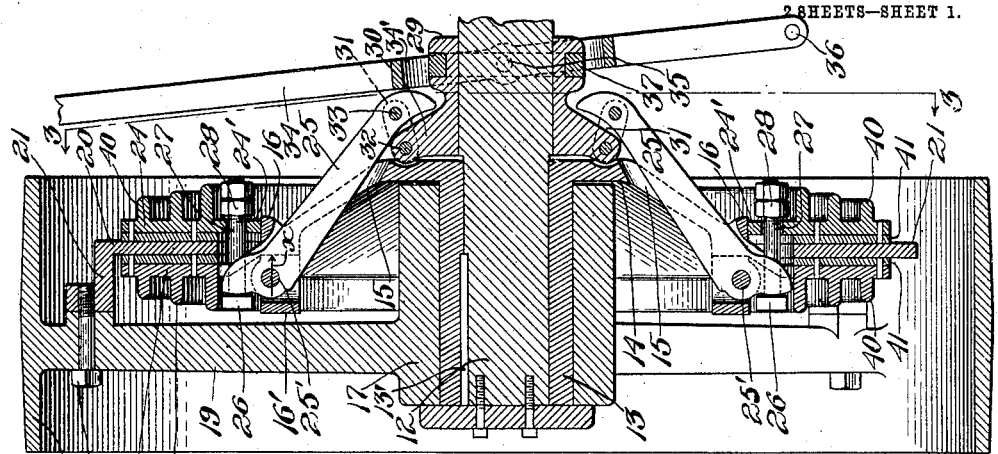
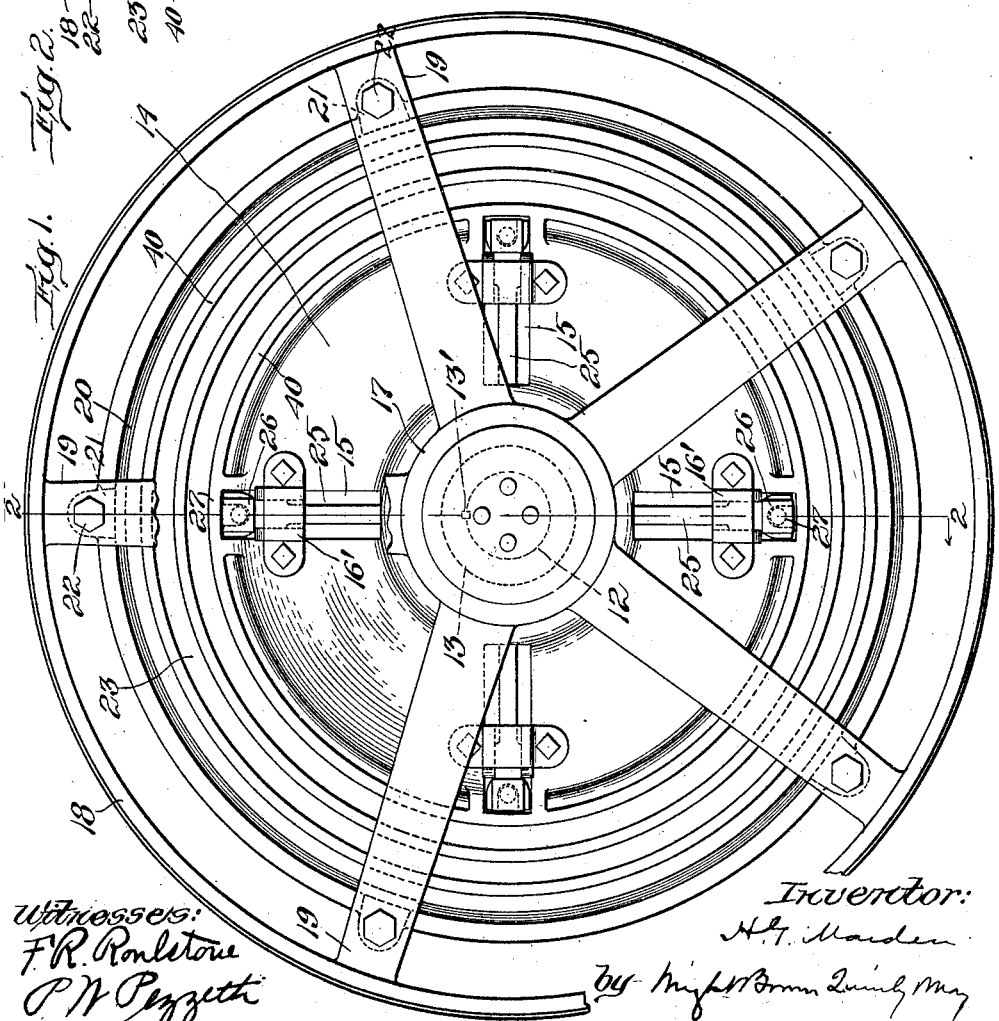

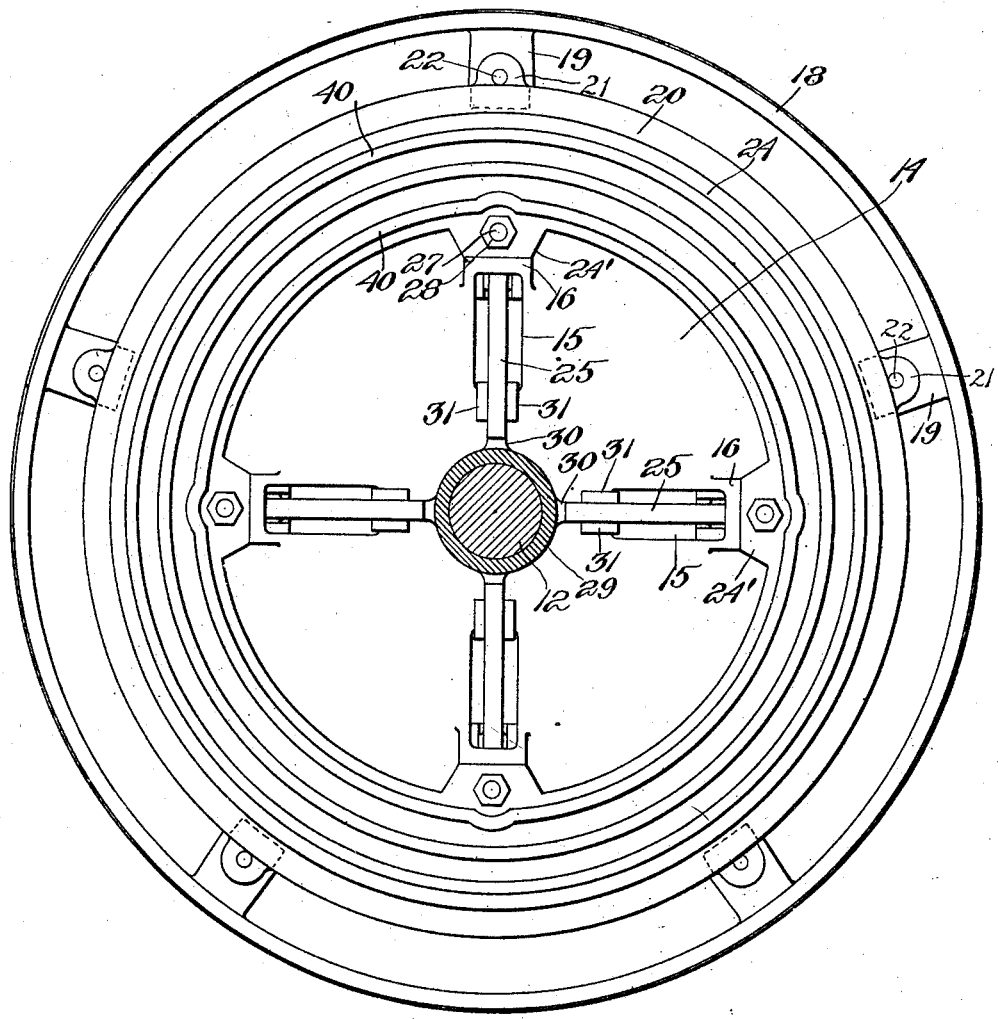

UNITED STATES PATENT OFFICE.

HENRY G. MARDEN, OF QUINCY, MASSACHUSETTS, ASSIGNOR TO JOHN WALKER MACHINE COMPANY, OF BOSTON, MASSACHUSETTS, A CORPORATION OF MASSACHUSETTS.

CLUTCH.

964,874.

Specification of Letters Patent. Patented July 19, 1910.

Application filed June 29, 1909. Serial No. 504,969.

*To all whom it may concern:*

Be it known that I, HENRY G. MARDEN, of Quincy, in the county of Norfolk and State of Massachusetts, have invented certain new and useful Improvements in Clutches, of which the following is a specification.

This invention relates to a clutch for connecting a loose pulley with a shaft on which the pulley is mounted, in such manner as to make the pulley fast on the shaft and resist any strains tending to cause the pulley to slip.

Clutches of this type have heretofore usually been so constructed as to require considerable space along the shaft at one side of the pulley to accommodate the controlling members and allow them to move, thus requiring extra length of shafting and an amount of space which is objectionable particularly when the clutch is a part of a machine which may need to have other parts close to the clutch.

One of the objects of my present invention is to provide an improved clutch mechanism which will occupy a minimum amount of space lengthwise of the shaft, most of the parts being located within the lateral space bounded by the edges of the rim of the pulley.

Another object is to provide for the gripping effect of the operating levers to take place at a considerable distance from the hub of the pulley to enable the parts to be made light and still possess all the necessary strength.

Another object is to provide a simple and durable structure embodying the least possible number of parts and so reducing liability of loss of proper adjustment due to wear. In this connection, an especial advantage is possessed by my improved structure employing no screwed parts for operating the clutch which screws are liable to work loose.

The invention consists in the improvements which I will now proceed to describe and claim.

Of the accompanying drawings, forming a part of this specification,—Figure 1 represents a side view of a clutch embodying my invention. Fig. 2 represents a section on line 2—2 of Fig. 1. Fig. 3 represents a section on line 3—3 of Fig. 2, and a side elevation of the parts at the left of said line, constituting, in effect, a side view opposite to that of Fig. 1.

The same reference characters indicate the same parts in all the figures.

In the drawings,—12 represents a shaft to which a sleeve 13 is rigidly attached, said sleeve being engaged with the shaft by means of a spline 13″, and being provided at one end with an outwardly projecting web or flange 14 which is substantially cone-shaped, the base of the cone being well within the lateral space bounded by the edge of the pulley rim and at a considerable distance from the sleeve carrying said web or flange. The web is formed with radial slots 15, and its margin is provided with a series of guides 16 the outer faces of which are parallel with the axis of the sleeve and shaft for a purpose presently described. The web is also provided with a pair of ears 16′ near the outer end of each slot 15, said ears projecting from the side of the web opposite to the guides 16.

17 represents the hub of a loose pulley which is mounted to rotate freely and have a slight endwise movement on the sleeve 13, the rim 18 of the pulley being connected with the hub by radial arms 19.

20 represents a double-faced central clutch member which is a flat-sided ring having arms 21 attached by bolts 22 to the pulley arms 19, the said clutch member 20 projecting inwardly from the arms 21 toward the center of the pulley.

23 and 24 represent complemental side clutch members of annular form located at opposite sides of the central clutch member 20, the members 23 and 24 having inner faces adapted to frictionally engage the opposite sides of the central clutch member 20. The inner clutch member 23 is rigidly attached to or formed on the web 14, and the outer clutch member 24 has ears 24′ adapted to slide on the outer faces of the guides 16 which form bearings or ways for said member 24 and hold it concentric with the axis of the sleeve and shaft.

Means are provided for pressing the members 23 and 24 simultaneously against the member 20 to set up a firm frictional engagement between said members, and thus lock the pulley to the shaft. Said means in this embodiment of my invention include a series of levers 25 pivoted at 25′ to the ears 16′, and having outwardly projecting shorter arms bearing on the heads 26 of bolts 27 which are movable crosswise of the clutch member 23, and have enlargements preferably formed by nuts 28 bearing on the outer side of the clutch member 24. The longer arms of the levers 25 are inclined inwardly toward the shaft and extend under the guides 16 and through the slots 15 in the web 14, in a direction so that their inner ends are near one end of the sleeve 13 and project but slightly outside of the space bounded by the edge of the pulley rim.

29 represents a collar which is loosely mounted on the shaft 12, close to the smaller end of the cone formed by the flange or web 14, on the shaft. The collar is provided with outwardly projecting ears 30 connected by links 31 with the longer arms of the levers 25, the links being pivoted at 32 to the ears 30, and at 33 to the levers 25.

34 represents a shipping lever fulcrumed at 36 to a fixed support, not shown, said lever having an open portion 34′ which surrounds the collar 29, and is engaged with trunnions 35 projecting outwardly from a ring 37 occupying a groove in the collar 29, the collar being rotatable with the pulley and shaft, and the ring 37 being held from rotating by its engagement with the lever 34.

When the lever 34 is moved to an extreme inward position toward the pulley, the clutch members 23 and 24 are sufficiently loose to have no operative clamping engagement with the clutch member 20. A movement of the lever 34 toward the right, as viewed in Fig. 2, causes the links 31 and the longer arms of the levers 25 to act as toggle joint members, the longer arms of the levers being caused to swing outwardly, and their shorter arms inwardly. The shorter arms are thus caused to press the bolt heads 26 inwardly, and cause the bolt enlargements 28 to increase the pressure of the clutch member 24 against the outer side of the clutch member 20. At the same time the bolt heads 26 act as fulcrums for the shorter arms of the levers 25, so that said levers exert an increased pressure on the pivots 25′ in the direction indicated by the arrow $x$ in Fig. 2, thus imparting a slight sidewise movement to the pulley in the direction required to press the inner side of the clutch member 20 against the clutch member 23, said member 20 being connected rigidly with the pulley through the arms 21. It will be seen therefore that the clutch members 23 and 24 are simultaneously pressed against the clutch member 20, all the clutch members being quite large, so that large frictional areas are brought into use to lock the pulley to the shaft without requiring any of the parts to be made especially heavy. The sleeve 13 and the web constitute a support for the levers 25 and the clutch members 23 and 24, said support guiding the outer clutch member.

The outer sides of the clutch members 23 and 24 are preferably provided with annular strengthening ribs 40, and their inner sides with facings 41 of wood or suitable material bearing frictionally on the flange 20.

I claim:—

1. A clutch comprising a sleeve, a pulley loosely mounted thereon, said sleeve having a cone-shaped web at one end, the margin of said web being within the space bounded by the width of the pulley rim, said pulley and the margin of the web having co-acting clutch members, and means for frictionally engaging said clutch members, said means including levers pivotally supported by said web.

2. A clutch comprising a sleeve, a pulley loosely mounted thereon, said sleeve having a cone-shaped web at one end, the margin of said web being within the space bounded by the width of the pulley rim, said pulley having a double-faced clutch member, complemental side clutch members supported by said web and located at opposite sides of said double-faced member, and means for frictionally engaging said clutch members.

3. A clutch comprising a sleeve, a pulley loosely mounted thereon, said sleeve having a cone-shaped web at one end, the margin of said web being within the space bounded by the width of the pulley rim, said pulley having a double-faced clutch member, complemental side clutch members supported by said web and located at opposite sides of said double-faced member, one of the side members being fixed to the web and the other side member being slidably supported thereby, and means for frictionally engaging said clutch members.

4. A clutch comprising a sleeve, a pulley loosely mounted thereon, said sleeve having a cone-shaped web at one end, the margin of said web being within the space bounded by the width of the pulley rim, said pulley having a double-faced central clutch member, complemental side clutch members supported by said web and located at opposite sides of said central member, one of the side members being fixed to the web and the other slidingly supported thereby, levers pivoted to said web, connections whereby said levers may clamp the side members against the central member, and means for actuating said levers.

5. A clutch comprising a sleeve, a pulley loosely mounted thereon and having a double-faced central clutch member, said sleeve having a cone-shaped web at one end, said web being radially slotted and having its marginal portion located within the space bounded by the width of the pulley rim, the marginal portion of the web having ears projecting from one side and guides projecting from its other side, two side clutch members one of which is fixed to the web and the other slidably mounted on said guides, levers pivoted to the ears of the web and extending through the said slots, connections whereby the levers may clamp the side clutch members against the central member, and means for actuating said levers.

In testimony whereof I have affixed my signature, in presence of two witnesses.

HENRY G. MARDEN.

Witnesses:
F. R. ROULSTONE,
P. W. PEZZETTI.